Patented Oct. 10, 1944

2,359,862

UNITED STATES PATENT OFFICE 2,359,862

QUATERNARY AMMONIUM DERIVATIVES

Adrian Laverne Linch, Wilmington, Del., assignor to E. I. du Pont de Nemours & Company, Wilmington, Del., a corporation of Delaware No Drawing. Application July 20, 1942,
Serial No. 451,681

6 Claims. (Cl. 260—204)

This invention relates to quaternary ammonium derivatives substituted, through an ester linkage, with organic compounds and processes for their production and use.

It is an object of this invention to produce a new class of quaternary ammonium derivatives having a multitude of useful applications in the industrial arts. A further object is to produce known quaternary ammonium derivatives in a more simple and expeditious manner than was heretofore possible. A still further object is to solubilize dyes and other organic compounds which are ordinarily water insoluble. A still further object is to produce water soluble dyes which may be applied to textiles and other materials and rendered insoluble thereon by a simple and effective treatment. Additional objects will become apparent from a consideration of the following description and claims.

These objects are attained in accordance with the hereinafter described invention wherein quaternary ammonium compounds containing an acid halide grouping are esterified with organic compounds containing a hydroxyl group. In a more restricted sense this invention is concerned with the esterification of quaternary ammonium compounds having substituted thereon an acid halide grouping with a cyclic organic chemical compound having substituted thereon an aliphatic hydroxyl group, the products of such esterification and processes for their use. In a still more restricted sense this invention pertains to quaternary ammonium derivatives comprising a betaine type radical linked to the radical of a dye through an ester group and an alkylene group.

The invention may be more readily understood by a consideration of the following illustrative examples wherein the quantities are stated in parts by weight. In each of these examples an equation is given to designate the probable reaction which occurs.

EXAMPLE 1

*Betaine methyl ester chloride*

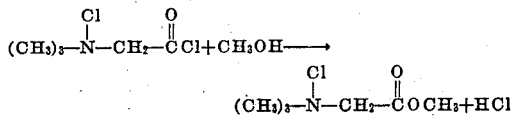

86 parts of N-chloro-betainyl chloride (prepared according to copending application Serial No. 451,682, filed of even date herewith and entitled "Organic quaternary ammonium derivatives") are added to 600 parts of methyl alcohol. A vigorous reaction begins at once and hydrochloric acid is liberated. When the reaction has subsided, the mixture is heated at 70–75° C. (reflux) for five hours, and the product recovered by evaporating the excess methyl alcohol under vacuum. The crude product is purified by crystallization from a solution of 20% methylalcohol in acetone. A nearly quantitative yield of white crystals which melt with decomposition at 167° C. is obtained.

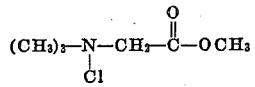

Analysis:

Per cent chlorine—found=20.56%—theory= 21.55%.

Per cent nitrogen—found=8.08%—theory= 8.50%.

This procedure is used in the preparation of other esters (methyl, ethyl, propyl, isopropyl, butyl, isobutyl, amyl, hexyl) of nitrogen substituted betaines and carbon substituted betaines by condensing the appropriate alcohol with a quaternary ammonium substituted carbonyl, or sulfonyl halide, i. e., betainyl hydrogen sulfate chloride (Example 3), N-chloro-C-tetradecyl betainyl chloride (Example 4), N-chloro-N-benzyl betainyl chloride (Example 5), N-chloro-N-phenyl betainyl chloride, X-(N-chloro-trimethylamino-methyl)-beta-naphthoyl chloride (Example 6), meta (omega-N-chloro-pyridyl-acetyl)-amino-benzoyl chloride (Example 7), N-chloro-sulfo-betainyl chloride (Example 8), phenyl benzyl dimethyl ammonium sulfate sulfone chloride (Example 9), etc. of the aforementioned copending application.

For example, 10 parts of N-chloro-(N'-chloro-betainyl) betainyl chloride (Example 2) digested in 45 parts of methyl alcohol gives a quantitative yield of the methyl ester which melts with decomposition at 146-148° C.

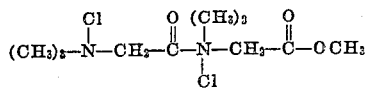

Analysis:
  Per cent nitrogen—found 10.28%—theory 10.10%
  Per cent chlorine—found 25.16%—theory 24.4%

EXAMPLE 2

*Betaine resorcinol ester chloride*

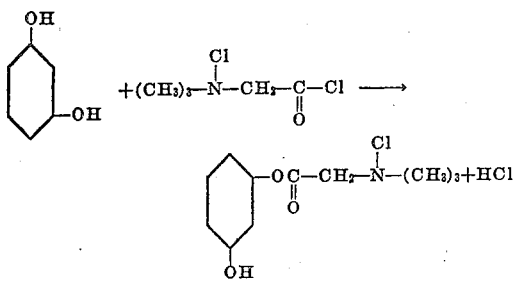

Twenty-two parts of resorcinol and 35 parts of N-chloro-betainyl chloride are suspended in 125 parts of toluene. Then over a fifteen minute period, a solution of 16 parts of pyridine dissolved in 40 parts of toluene is added. An exothermic reaction takes place, and a sticky amorphous product separates out. After standing 24 hours, the toluene is decanted off, and the residue triturated in 150 parts of 10% anhydrous methyl alcohol in dry acetone. The white, crystalline product is a mixture of the mono and dibetainyl ester chlorides of resorcinol and melts at 187-189° C.

scribed in the aforesaid copending application produce aryl esters with equal facility.

EXAMPLE 3

*Beta-(N-phenyl-N-ethyl)-amino-ethyl betainate chloride*

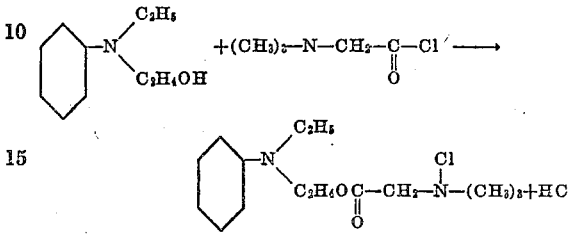

Seventy-eight parts of ethyl beta-hydroxy ethyl aniline is dissolved in 250 parts of pyridine. To this solution is added 90 parts of N-chloro-betainyl chloride. A strongly exothermic reaction takes place. The mixture after standing at room temperature for 24 hours, is heated at 70° C. for 1½ hours. The mixture is chilled in an ice pack and filtered to remove insoluble impurities, and the mixture evaporated on a steam bath until free of pyridine. There is obtained 200 parts of a viscous paste which may be dissolved in 500 parts of water and used as a coupling component in the synthesis of water soluble azo dyes.

The corresponding beta-(N-phenyl-N-ethyl)-amino-ethyl ester of C-tetradecyl betaine bromide is prepared by condensing 29.5 parts of N-bromo-C-tetradecyl betainyl chloride (Example 4 of the aforesaid copending application) with 6.6 parts of beta-hydroxy-ethyl-ethyl aniline. Twenty-three parts of this product readily dissolves in 100 parts of water and yields soluble azo dyes when coupled with aromatic diazonium salts.

EXAMPLE 4

*6,6'-di-(beta-N-chloro-betainoxy-ethoxy)-thioindigo*

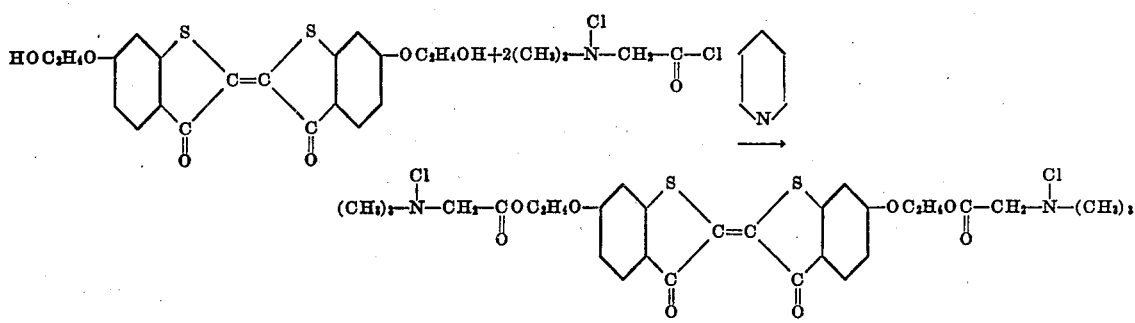

Betainyl esters of a variety of phenols such as hexyl resorcinol, para-iso-octyl phenol, thymol, menthol, guaiacol, 1,4-dihydroxy-2-methyl naphthalene, vitamin K, cholesterol, physiologically active sterols such as vitamin D and provitamin D, vitamin E, sex hormones, etc. are prepared in a similar manner. Other quaternary ammonium substituted carbonyl or sulfonyl halides de- 4.2 parts of 6,6'-di-(hydroxy-ethoxy)-thioindigo and 6.5 parts of N-chloro-betainyl chloride are suspended in 25 parts of pyridine. As soon as the exothermic reaction has subsided, the mixture is heated at 75-80° for 15 to 20 minutes, then boiled under reflux for four hours. After the reaction mass has been cooled to room temperature, 20 parts of anhydrous methyl alcohol are added. The product is recovered by filtration, washed with 20 parts of methyl alcohol and dried under vacuum.

Analysis:
Per cent nitrogen—found 3.92%—theory 4.07%
Per cent sulfur—found 9.10%—theory 9.32% tate, wool, nylon, etc. Similar results are obtained with 1-methyl-amino-4-hydroxy-ethyl-amino-anthraquinone, 1 - hydroxy - 4 - beta-hydroxy-gamma -chloro - propylamino - anthraquinone, 1,4-di(meta-(hydroxy - methyl) - phenyl-amino)-anthraquinone, 1-(beta-hydroxy-ethyl-amino)-benzanthrone, etc.

Example 5

2-chloro-4,6-dinitro-2'-acetylamino-5'-methoxy-4'-di-(beta-N-chloro-betainoxy ethyl)-amino-azo benzene

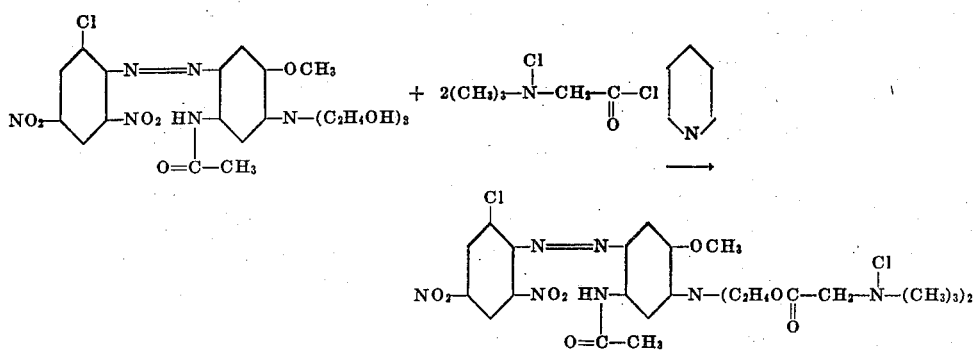

Five parts of the blue azo dye obtained by coupling diazotized 2-chloro-4,6-dinitro-aniline to para - methoxy - meta - di-(beta-hydroxy ethyl) amino acetanilide, and 5.2 parts of N-chloro-betainyl chloride are suspended in 25 parts of pyridine. After the exothermic reaction has subsided, the mixture is allowed to stand at room temperature for 24 hours, then heated at 70° C. for two hours. The mixture is diluted with 140 parts of dry acetone and filtered. The tacky, crude product is suspended in 40 parts of dry acetone and absolute methyl alcohol added until the aggregate becomes granular. The mixture is chilled thoroughly in an ice pack and filtered. Two parts of a water-soluble steel grey product is obtained. The remainder of the product may be recovered as a water soluble paste by evaporation of the solvent extracts.

The product dyes cellulose acetate in blue-grey shades which develop to beautiful blue shades in the presence of a dilute alkali such as a 1% sodium carbonate solution. The dye also has affinity for wool and nylon.

A water soluble orange dye which develops to a deep scarlet in the presence of weak alkalies is obtained by condensing 4-nitro-4'-ethyl-beta-hydroxy-ethyl amino azo benzene with N-chloro-betainyl chloride under similar conditions.

Water soluble dyes also may be produced by coupling with a component containing a beta-(N-chloro-betainoxy)-ethyl-amino group. For example, diazotized para-amino-acetanilide couples with beta-(N-chloro-betainoxy ethyl)-aniline to produce a water soluble cellulose acetate dyestuff.

Water soluble dyes of the anthraquinone series may also be obtained by this method. For example, condensation of 1,4-di-(beta-hydroxy-ethyl) amino anthraquinone with N-chloro-betainyl chloride in pyridine yields a blue, water soluble dye which shows affinity for cellulose ace-

Example 6

1-(2',5'di-(beta - N -chloro - betainoxy - ethoxy)-phenyl-azo)-2-hydroxy-3-naphthanilide

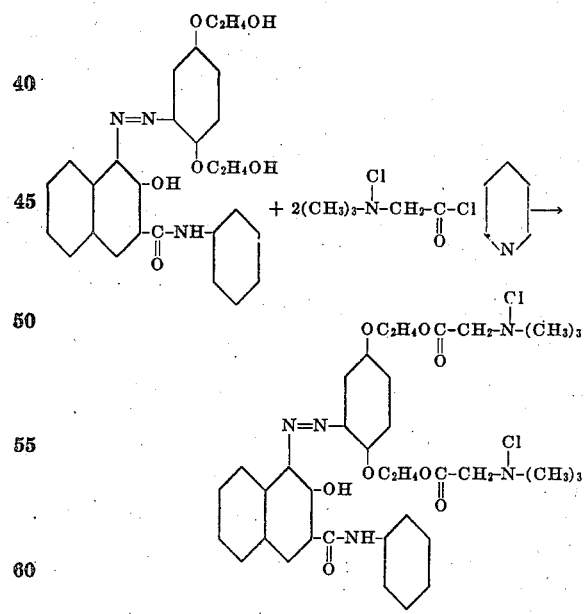

Six parts of the naphthanil dye obtained by coupling diazotized 2,5-di-(beta-hydroxy-ethoxy)-aniline with 2-hydroxy-3-naphthanilide, and 10 parts N-chloro-betainyl chloride are mixed with 75 parts of pyridine. When the exothermic reaction has subsided, the mixture is heated to boiling under reflux over a 2½ hour period, and held at temperature for 3½ hours. The reaction mixture is then chilled in an ice pack, filtered, and the crude product washed with 60 parts of acetone. Further purification to remove any unreacted dye is accomplished by extraction with dry acetone in a Soxhlet apparatus. 5.9 parts of a water soluble lavender powder is obtained. Additional product may be recovered by evaporation of the pyridine mother liquors.

The product has excellent solubility in water, good affinity for cotton, rayon and wool fiber, and quickly regenerates the original insoluble dyestuff in alkaline solutions. Prints on cotton, or rayon cloth are developed to full color value, and bright shade in a rapid steam ager (3 minutes exposure to saturated steam) without the use of any auxiliary materials except the usual starch gum thickening agent.

Analogous results are obtained with derivatives in which the beta-hydroxy ethoxy groups are located in the naphthanilide component. For example, the dye obtained by coupling tetrazotized benzidine with two molecules of 2-hydroxy - 2'-5'-di - (beta - hydroxy - ethoxy) - 3 - naphthanilide readily condenses with N-chloro-betainyl chloride, or other quaternary ammonium acyl or sulfonyl chlorides disclosed in the aforesaid copending application to yield water soluble esters.

In general, the water solubility of azo dyes containing a hydroxy alkyl group is increased by esterification with a quaternary ammonium substituted acyl or sulfonyl halide. Additional examples are: para-(beta-hydroxy-ethyl)-aniline coupled to beta-naphthol, 2,5-di-(beta-hydroxy-ethoxy)-aniline coupled to phenyl methyl pyrazolone, 1 - amino - 6 - (beta-hydroxy-ethoxy)-naphthalene coupled to salicylic acid, para-(alpha-hydroxy-ethyl)-aniline coupled to para-cresol, meta-aminobenzyl alcohol coupled to aceto - acetanilide, 3 - nitro - 4-(3'-chloro-2'-hydroxy-propoxy)-aniline coupled to ethyl beta-hydroxy-ethyl aniline, etc.

A dark red azo dye derivative is obtained by condensing two parts of the pigment obtained by coupling meta-aminobenzyl alcohol with 2-hydroxy-3'-hydroxy methyl-3-naphthanilide with four parts of N-chloro-betainyl chloride in 50 parts of boiling pyridine for two hours. The product is purified by first washing with acetone in a Soxhlet apparatus, then with 20 parts of methyl alcohol at room temperature. There is obtained 2.6 parts of dark red powder which by analysis corresponds to a mono ester containing methyl alcohol of crystallization.
Analysis:

Per cent nitrogen—found=8.31%—theory= 8.56%

Per cent chlorine—found=5.49%—theory= 5.43%

EXAMPLE 7

1-(N-chloro - betainyl) - amino - 4 - (N - chloro-betainoxy)-anthraquinone

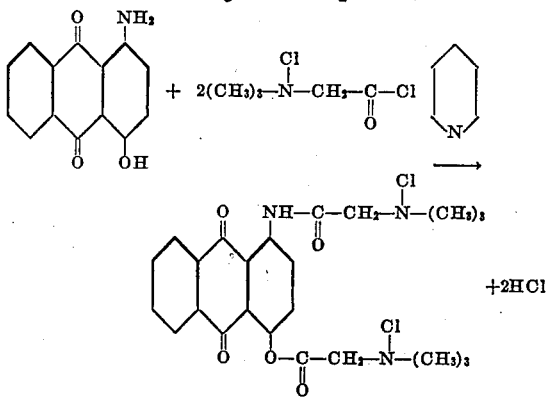

Twenty-two parts of 1-amino-4-hydroxy-anthraquinone is dissolved in 200 parts of pyridine. To this solution is added 38 parts of N-chloro-betainyl chloride and the mixture heated to 80–85° C. The reaction mixture is held at temperature for 2 hours, then boiled under reflux for 3½ hours. The mixture is cooled to room temperature, 80 parts of methyl alcohol added and the crystalline precipitate filtered off. It is then washed with 80 parts of methyl alcohol. Twenty-five parts of crude product, which may be further purified by crystallization from methyl alcohol is obtained.

The process can be applied also to the synthesis of a variety of betainyl esters of hydroxy condensed-ring compounds, for example: 1,5-di-amino-4,8-dihydroxy - anthraquinone, alizarine, quinizarine, 1-amino-4 - para - hydroxy - phenyl-amino-anthraquinone, 1-hydroxy - benzanthrone, dihydroxy-dibenzanthrone, 1,5 - dianisoylamino-4,8-dihydroxy-anthraquinone.

EXAMPLE 8

2-(N-chloro - betainoxy)-5 - methyl-4'-acetylamino-azo-benzene

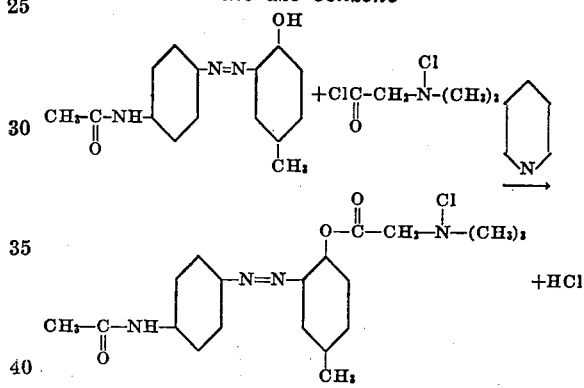

Sixty-five parts of the yellow azo dye obtained by coupling diazotized para-amino-acetanilide with para-cresol and 103 parts of N-chloro-betainyl chloride are suspended in 1200 parts of toluene. The mixture is heated to 90°, and then 40 parts of pyridine dissolved in 200 parts of toluene are added. The mixture is boiled under reflux for 1¾ hours, cooled to room temperature and the toluene removed by decantation. The residue is extracted with 1600 parts of dry acetone and resolved to a granular product by slowly adding anhydrous methyl alcohol. The water soluble product is filtered off and dried at room temperature. The ester exhausts rapidly and completely from a weakly acid dyebath onto cellulose acetate to give bright yellow shades of excellent fastness properties.

EXAMPLE 9

2,4-di-(N-chloro-betainoxy)-3-phenyl- azo- quinoline

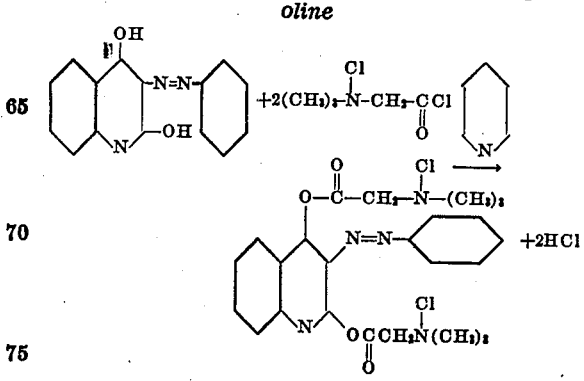

Thirty-two parts of the dye obtained by coupling phenyl diazonium chloride with 2,4-dihydroxy-quinoline are dissolved in 500 parts of pyridine. To this solution is added 80 parts of N-chloro-betainyl chloride, the mixture heated to boiling under reflux over a 2-hour period, and refluxed for 2 hours. The crude product is recovered by chilling the reaction mixture and filtering. The crude product is extracted from the filter cake with 200 parts of absolute methyl alcohol. The alcohol extracts and pyridine mother liquors are evaporated together on a steam bath, and the residue triturated in 8000 parts of dry 10% methyl alcohol in acetone. 38 parts of a water soluble product which dyes cellulose acetate, wool, nylon, silk, etc. in yellow shades is obtained.

Analysis:

Per cent chlorine—found=13.40%—theory= 13.25%

An analogous ester is obtained by condensing 3 parts of the azo dye obtained by coupling para-(beta-amino-ethyl)-aniline with 2,4-dihydroxy quinoline in 25 parts of pyridine with 7 parts of N-chloro-betainyl chloride.

Equally good results are obtained by using other quaternary ammonium substituted acyl and sulfonyl halides such as N-chloro-sulfo-betainyl chloride, N-benzyl-N-chloro-betainyl chloride, etc. described in the aforesaid copending application.

Example 10

*Dodecyl-N-benzyl-N-phenyl-dimethyl ammonium sulfonate sulfate*

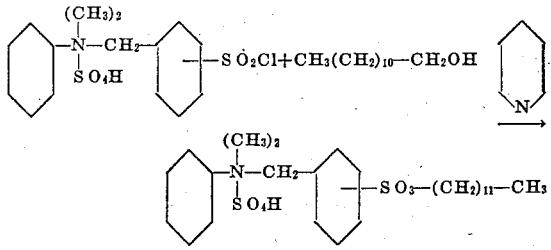

To a solution of 90 parts of dodecyl alcohol dissolved in 350 parts of pyridine, there is added 153 parts of N-benzyl-N-phenyl dimethyl ammonium sulfate sulfone chloride prepared according to Example 9 of the aforesaid copending application. When the strongly exothermic reaction has subsided, the mixture is boiled under reflux for one hour. The pyridine is removed by evaporation on a steam bath. 110 parts of concentrated hydrochloric acid is added to the residue, and the product extracted with 2400 parts of acetone. The acetone is evaporated off and the crude product dried over phosphoric anhydride in vacuo. The product is separated from excess dodecyl alcohol by either dissolving in water and separating the insoluble dodecyl alcohol, or by extraction with diethyl ether to dissolve out the unreacted dodecyl alcohol.

Analysis:

Melting point=100° C.—per cent sulfur— found 11.43% theory 11.5%

The dodecyl N-benzyl-N-phenyl dimethyl ammonium sulfonate is quite soluble in water and exhibits unusual foaming, wetting and detergent properties.

Example 11

*2-(N-chloro-betainoxy)-3-naphthanilide*

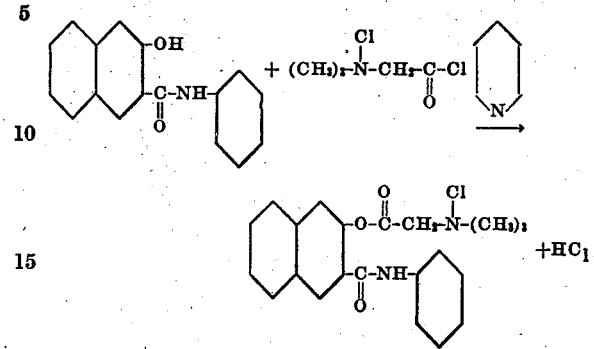

18.3 parts of N-chloro-betainyl chloride is added to a solution of 26.3 parts of 2-hydroxy-3-naphthanilide in 100 parts of pyridine. The mixture is heated at 90° C. for 2 hours and filtered. The solid filter cake is washed with pyridine, and then with dry acetone until free of pyridine. The product is completely soluble in water, and does not couple with diazotized aromatic amines in neutral or acidic aqueous solutions, but does couple readily in the presence of alkaline reagents to give azo pigments.

Prints of outstanding brightness and wash fastness on cotton or rayon are obtained by printing a solution of 2-(N-chloro-betainoxy) 3-naphthanilide and an aryl diazonium zinc chloride double salt, such as 2,5-dichloro-phenyl diazonium chloride zinc chloride, thickened with the usual gums and starches and developing in an alkaline bath, or an alkaline atmosphere. N-chloro-betainyl esters of substituted naphthanilides likewise find application in dyeing and printing, for example: 2-(N-chloro-betainoxy), 3(2'-methyl) naphthanilide, 2(N-chloro-betainoxy) 3(4'-chloro)-naphthanilide, 2(N-chloro-betainoxy) 3(3'-methoxy)-naphthanilide, etc.

It is to be understood that the foregoing examples are illustrative merely of some of the numerous modifications to which this invention is susceptible. They may be varied widely, both with respect to the individual reactants and the conditions of reaction, without departing from the scope of this invention.

The reaction temperatures may vary over a wide range without defeating the objects of the invention. As a general rule, however, it is advisable to maintain the temperature within the range of about 20° C. to about 150° C. Temperatures above or below the foregoing range may be employed, if desired, although the results are generally not quite as satisfactory. Where the particular reaction under consideration may involve undesirable side reactions it is frequently possible to avoid them by reducing the temperature below 20° C. In the same manner, where it is desired to hasten the reaction this may ordinarily be accomplished by raising the temperature above 150° C.; but in this connection it should be noted that the temperature should be maintained below the decomposition point of the quaternary ammonium compounds and the remaining reactants.

Normal atmospheric pressure is generally preferable, although it is not essential. It is contemplated that either subatmospheric or superatmospheric pressures may be employed. The former is, in particular, helpful where it is desired to speed up the removal of hydrohalic acid, lower the boiling point of the diluent or facilitate the removal of solvents when the reaction has been completed.

As a general rule it may be stated that one molecular equivalent of quaternary ammonium compound should be employed for each alkyl- or aryl-hydroxyl group to be esterified. Where it is desired to conduct the reaction to completion an excess of 10% to 50% of quaternary ammonium compound is generally sufficient to accomplish this purpose. It should be noted that it is not always necessary nor desirable to convert each hydroxyl group in a polyhydroxy substituted molecule to a quaternary ammonium substituted ester. Incompletely esterified compounds are embraced within the scope of this invention and have many important uses. For instance, para-(beta-hydroxy-ethoxy)-phenol condensed with one mole of N-bromo betainyl bromide yields the corresponding para-(beta-N-bromo-betainoxy-ethoxy)-phenol. This latter is an important compound having many desirable uses.

Diluents are usually advisable in order to provide sufficient physical contact between the reactants to assure a complete conversion thereof. However, it should be noted that the presence of diluents is not necessary, and may be dispensed with if desired. Furthermore, some condensations may be carried out by fusing the reactants together. Where condensation by fusion is resorted to an excess of the hydroxylated reactants may be employed in order to lower the fusion temperature.

To facilitate the reaction the employment of condensing agents is frequently quite helpful. Agents coming within this category are, for example, pyridine, dimethyl aniline, diethyl cyclohexylamine, morpholine, triamylamine, triethanolamine, dimethyl formamide, piperidine, quinoline, and the like. These agents may be employed not only as condensing agents or acid acceptors, but may also be employed as diluents, in which case an excess thereof is desirable. The condensing agent or agents may be used also in conjunction with an inert diluent or diluents.

It is not essential for either of the reactants to be soluble in the diluent or condensing agent in order to obtain efficient condensation. In the same manner, no specific quantity of diluent or condensing agent is required. It is advisable, however, when using condensing agents to have a sufficient amount thereof present to absorb the hydrohalic acid produced.

Quaternary ammonium compounds embraced within the scope of this invention are those which contain an acid halide grouping, preferably a carbonyl chloride, carbonyl bromide, sulfonyl chloride, or sulfonyl bromide group. Many of the agents conforming to the aforesaid requirements may be designated by the following general formula:

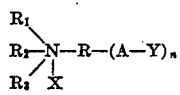

in which R=a bifunctional organic radical connecting N with A. Examples of such groups are alkylene, cyclo-alkalene, aralkylene, arylene, heterocyclic or two or more such groups which are like or unlike connected by

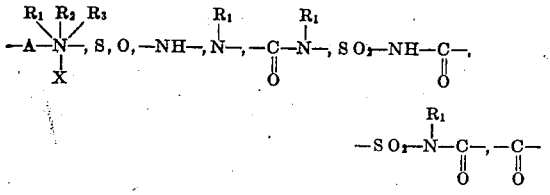

and their substitution products such as halogeno, nitro, nitroso, carboxyl, sulfonic, halogeno alkyl, alkoxy, etc.

$R_1$, $R_2$, $R_3$=alkyl, cycloalkyl, aralkyl, aryl, heterocyclic, $R_1$ and $R_2$ together with N form a heterocyclic ring, or $R_1$, $R_2$ and $R_3$ together with N form a heterocyclic ring, and their substitution products.

X=anion

Y=fluorine, chlorine, or bromine

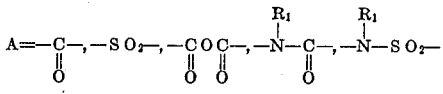

n=—a small, whole number.

Betaine type derivatives are preferred for optimum results over a wide range of conditions. These compounds have the characteristic betaine structure but may contain further substituents in place of or in addition to the usual substituents of the parent betaine compound. Likewise, in place of a carboxylic acid group they may contain a sulfonic acid group. As previously mentioned, this acid group is converted to an acid halide group, preferably by suitable reaction with a chlorinating or brominating agent, in accordance with the invention described in U. S. patent application Serial No. 451,682, filed of even date herewith and entitled "Organic quaternary ammonium derivatives."

It is to be understood that two or more quaternary ammonium derivatives may be used in place of a single derivative. By a suitable selection of individual derivatives of this type it is possible to further enhance the utility of the resulting esterification products.

The foregoing quaternary ammonium derivatives are esterified with organic hydroxy substituted compounds. The hydroxyl group may be either of an alcoholic or phenolic character. Likewise, the compound may contain a plurality of hydroxyl groups. A particularly useful class of compounds for this purpose comprises the various water insoluble dyes having substituted thereon one or more hydroxyl groups, preferably when such hydroxyl group occurs in a side chain and is attached to the nucleus of the dye through an alkylene group of no more than four carbon atoms. Azo and anthraquinone dyes in particular contain innumerable members which possess these characteristics, although it is to be understood that the invention is not restricted to these classes of dyes. In the same manner, dye intermediates having substituted thereon one or more hydroxyl groups may be utilized in place of or in addition to the foregoing and related dyes. Likewise, sterols and many other organic hydroxy substituted compounds which are not dyes or dye intermediates per se, may be treated in accordance with the preceding instructions to produce esters of appreciable value for numerous purposes.

It is to be understood that two or more organic hydroxy substituted compounds may be esterified with one or more of the quaternary ammonium derivatives previously mentioned. By a suitable selection of a multiplicity of such hydroxylated compounds it is possible to prepare esters having a wide range of desirable characteristics.

By means of the present invention a new class of quaternary ammonium derivatives is rendered available. Likewise, known quaternary ammonium derivatives can be produced in a simple and much more expeditious manner than was heretofore possible. Many ordinarily water insoluble compounds may be rendered water soluble in a new and surprisingly effective manner. The resulting water soluble compounds may be used for a variety of purposes wherein the parent insoluble compounds were either of no value or of greatly limited value. The parent compounds may be speedily produced from the quaternary ammonium derivatives by a simple and inexpensive treatment. This feature of the invention is particularly applicable to the dyeing field, and permits the wider use of dyes than would otherwise have been possible. These compounds have many uses not only in the dye field but in the pharmaceutical field and the field of organic synthesis generally.

As many apparently widely different embodiments of this invention may be made without departing from the spirit and scope thereof, it is to be understood that the invention is not limited to the specific embodiments thereof except as defined in the appended claims.

I claim:
1. A process for producing betaine esters which comprises reacting a betaine acid halide represented by the following formula:

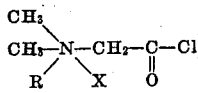

wherein R represents a hydrocarbon group, and X represents an anion of a strong acid; with an organic hydroxyl-containing esterifying agent in a liquid diluent medium.

2. The process of claim 1 wherein the liquid diluent medium is pyridine, which also acts as an acid acceptor.

3. A process for producing betaine esters which comprises reacting N-chloro-betainyl chloride with an organic hydroxyl-containing esterifying agent in a liquid diluent medium.

4. A process for producing betaine esters which comprises reacting N-chloro-betainyl chloride with 2-hydroxy-3-naphthanilide in pyridine.

5. A process for producing betaine esters which comprises reacting N-chloro-betainyl chloride with 1[2',5' di(beta - hydroxy - ethoxy)phenyl azo]2-hydroxy-3-naphthanilide in pyridine.

6. A process for producing betaine esters which comprises reacting N-chloro-betainyl chloride with 2-chloro-4,6-dinitro - 2'-acetyl amino-5'-methoxy-4'-di(beta-hydroxy-ethyl) amino azo benzene in pyridine.

ADRIAN LAVERNE LINCH.